Feb. 11, 1930.                    C. D. DAVIS ET AL                    1,746,695
                           APPARATUS FOR MAKING PLATE GLASS
                                  Filed Aug. 16, 1923
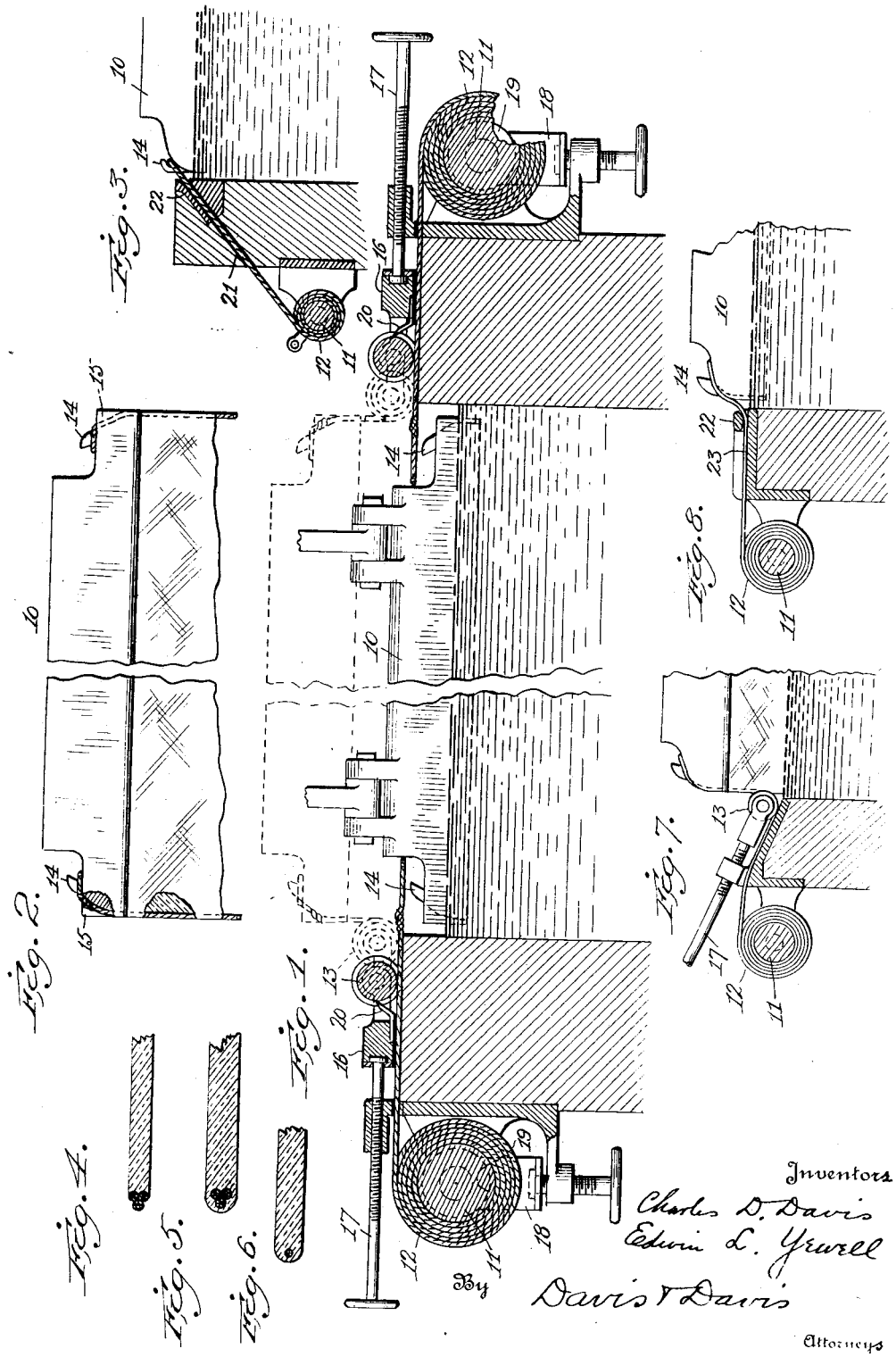

Patented Feb. 11, 1930

1,746,695

UNITED STATES PATENT OFFICE

CHARLES D. DAVIS AND EDWIN L. YEWELL, OF WASHINGTON, DISTRICT OF COLUMBIA

APPARATUS FOR MAKING PLATE GLASS

Application filed August 16, 1923. Serial No. 657,771.

This invention relates to that type of glass plate making methods in which the plate is drawn in the flat from a molten mass of glass, a bait-bar being used for drawing and mechanism being provided for slowly elevating the bait to thus draw the sheet out of the molten mass. A serious difficulty heretofore has been that the sheet tends to narrow as it leaves the molten mass, so that the drawing of a sheet of any considerable length has been impossible. The object of our invention is to provide means for preventing the narrowing of the sheet.

In the drawing—

Fig. 1 is a vertical sectional view showing one way of carrying our invention into effect;

Fig. 2 is a side elevation partly broken away showing a sheet of glass attached to the bait;

Fig. 3 is a vertical sectional view showing a modification;

Figs. 4, 5 and 6 are detail sectional views taken through one edge of the plate showing different ways of embedding the cable in the edges of the sheet.

Figs. 7 and 8 are views of two additional modifications.

In the drawing, 10 designates the bait-bar of usual construction, means (not shown) being provided for slowly elevating this bar after it is dipped into the molten mass of glass. At each side of the crucible or nozzle containing the molten glass, we arrange a drum 11, and on this drum we wind a metallic wire or cable 12. The free end of the cable is carried around a pulley 13 located on the top edge of the crucible approximately in line with the sheet of glass that the bait will draw out of the crucible when the bait is elevated. The free end of the cable, at a point beyond the pulley or roller 13, is attached to the adjacent end of the bait so that, as the bait ascends, the cable will be payed off the drum.

Any suitable means may be provided for attaching the free end of the cable to the end of the bait-bar. One way is to provide the top side of the bait-bar, adjacent the end thereof, with an upstanding hook 14 and looping the end of the cable around the same, so that, as the bait ascends, the cable will lie vertically against the end wall of the bait-bar, a vertical groove 15 being desirably provided in said end wall for the purpose of accurately positioning the cable with respect to the edge of the sheet of glass. The pulley 13 is desirably journaled in a slide 16 which is adapted to be moved inwardly and outwardly by means of a screw 17, whereby the pulley 13 may be drawn backwardly out of the way to permit the loop of the cable to be positioned directly over the hook 14, so that, as the bait ascends, the hook 14 will automatically engage in the loop. Before the bait ascends, pulley 13 is adjusted inwardly again to the position shown in dotted lines in Fig. 1, where the inner edge of its grooved periphery will lie approximately in line with the end of the bait, so that, as the bait ascends and picks up the cable, the cable will be drawn into the groove in the pulley and will be held by the pulley in position to embed itself in the edge of the sheet as the sheet ascends, it being understood, of course, that it is essential that the pulley be located so close to the surface of the molten glass that the sheet will not be permitted to cool down sufficiently to prevent the cable being embedded therein.

From the foregoing, it will be obvious that in practicing our process, we embed in each edge of the glass, as the glass ascends, a metallic wire or cable and that the solidifying of the glass locks the cable in the edge thereof. We prefer using a multistrand wire because such a wire will be less likely to strain or fracture the sheet because of any difference in the ratio of expansion between the metal of the cable and the glass. It will be necessary to put the cables under some tension, but this tension need not be great, as the cables need to be only sufficiently taut to resist the slight tendency of the sheet to narrow, and, of course, this tendency to narrow exists only while the sheet is in a molten state; that is, at points near the molten glass. Any suitable means may be used to put the desirable tension on the cable; we have shown a screw-operated brake-block 18 adapted to be forced with the desired degree of pressure against a brake-drum 19 on the cable-drum. It will be observed also that by keeping the two cables taut, all tendency for the sheet to wave or twist will be eliminated.

It will be understood that the wire or cable will become a permanent part of the sheet and in general will be cut off when the sheet is trimmed. Fresh lengths of cable are, of course, supplied for each sheet. It will be understood that it is desirable to position the guide-roller 13, or whatever other type of cable-guide is used, as near as possible to the surface of the molten mass, so that the cables will become embedded in the edges of the sheet while the edges are in a sufficiently soft condition to insure the firm adherence of the cable to the cooled sheet. We have shown in Fig. 4 that the cable need not be entirely embedded in the sheet, but may be merely arranged to adhere to its edges; in Figs. 5 and 6 we show the cable entirely embedded in the edge of the sheet. The depth of embedment in the sheet will be determined by the position of the guide 13 with reference to the edge of the sheet, as is obvious. To clear the roller-guide 13 of any glass that its periphery may pick up, we provide a scraper 20.

In the modification shown in Fig. 3, we provide a way of getting the cable down closer to the surface of the molten mass. We show an upwardly-inclined hole 21 formed in the end wall of the crucible or nozzle, the uper end of this hole terminating just above the surface of the molten mass, so that the cable will become embedded in the egde of the sheet at the point of formation thereof, i. e., just where it emerges from the molten mass. A suitable metallic guide-eye 22 is arranged at the upper end of the hole 21 to guide the cable as it is payed out from the drum during the ascension of the bait. It will be understood that many other ways of guiding the cable into the edge of the sheet before it becomes too hard to receive the cable may be devised without departing from the spirit of our invention. If necessary, wherever a roller-guide such as 13 is employed, means may be provided for adjusting the roller downwardly to a point nearer to or even into the surface of the molten glass, as shown in Fig. 7, but it is believed that this will not be necessary where the level of the molten glass is maintained close to the top of the crucible or nozzle.

In Fig. 8 the guide-eye is shown as formed on the inner end of a grooved plate embedded in the upper surface of the wall of the crucible.

What we claim as new is:

1. An apparatus for drawing plate glass in the flat embodying a container for the molten glass, a bait, a supply of metallic wire adjacent each end of the bait, the free end of the wire being adapted to be connected to the adjacent end of the bait, and means for continuously guiding and pressing the wire into the edge of the sheet while the same is in a soft condition, said means embodying a roller over which the wire runs, and means for positively and adjustably holding this roller in contact with the edge of the sheet.

2. In an apparatus for drawing sheet glass in the flat, a container for the glass, a bait, a drum of wire at each side of the container, the free end of the wire being adapted to be attached to the adjacent end of the bait so as to be hauled up therewith, means for guiding and pressing the wire into the soft edge of the sheet at a point near the molten mass of glass, and means for tensioning the wires as they are unwound from the drums by the ascending bait, said means for guiding and pressing the wire into the sheet consisting of a grooved roller over which the wire runs, devices for positively as well as adjustably holding the roller in contact with the sheet, and a scraper movable with the roller to clear the same of adhering glass.

3. The structure recited in claim 1, said means also embodying devices whereby the roller is positively adjusted downwardly and inwardly toward the bath.

4. An apparatus for drawing glass in the flat consisting of a container for the molten glass, a bait adapted to be dipped into the glass and elevated to thus form a sheet, and means at each end of the bait to automatically and continuously and permanently embed in the edge of the forming sheet a metallic wire, said metallic wire being a plural-strand cable, for the purpose set forth.

5. An apparatus for drawing glass in the flat consisting of a container for the molten glass, a bait adapted to be dipped into the glass and elevated to thus form a sheet, and means at each end of the bait to automatically and continuously and permanently embed in the edge of the forming sheet a metallic wire, means being provided whereby when the bait rises its respective ends will automatically pick up and engage the ends of the two wires and draw the wires upwardly as the bait rises.

6. An apparatus for drawing glass in the flat consisting of a container for the molten glass, a bait adapted to be dipped into the glass and elevated to thus form a sheet, and means at each end of the bait to automatically and continuously and permanently embed in the edge of the forming sheet a metallic wire, the end of each wire being provided with a loop and each end of the bait being provided with a loop-engaging-member adapted to pick up the end of the wire and draw the same upwardly as the bait rises.

In testimony whereof we hereunto affix our signatures this 16th day of August, 1923.

CHARLES D. DAVIS.
EDWIN L. YEWELL.